(12) United States Patent
Zhang et al.

(10) Patent No.: US 8,010,514 B2
(45) Date of Patent: *Aug. 30, 2011

(54) SYSTEM AND METHOD FOR A DISTRIBUTED OBJECT STORE

(75) Inventors: Zheng Zhang, Beijing (CN); Wei Chen, Beijing (CN); Yu Chen, Beijing (CN); Chao Jin, Beijing (CN); Dan Teodosiu, Bellevue, WA (US); Qiao Lian, Beijing (CN); Shiding Lin, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/855,271

(22) Filed: Aug. 12, 2010

(65) Prior Publication Data

US 2010/0325476 A1    Dec. 23, 2010

Related U.S. Application Data

(63) Continuation of application No. 10/993,536, filed on Nov. 19, 2004, now Pat. No. 7,778,984.

(51) Int. Cl.
*G06F 7/00* (2006.01)
*G06F 17/00* (2006.01)
(52) U.S. Cl. .................. 707/696; 707/610
(58) Field of Classification Search ............ 707/610, 707/696
See application file for complete search history.

(56) References Cited

U.S. PATENT DOCUMENTS

| | | | |
|---|---|---|---|
| 5,963,944 A | 10/1999 | Adams | |
| 6,038,689 A | 3/2000 | Schmidt | |
| 6,044,444 A | 3/2000 | Ofek | |
| 6,115,830 A | 9/2000 | Zabarsky | |
| 6,338,092 B1 | 1/2002 | Chao | |
| 6,463,454 B1 | 10/2002 | Lumelsky | |
| 6,466,980 B1 | 10/2002 | Lumelsky | |
| 6,493,715 B1 | 12/2002 | Funk | |
| 6,694,450 B1 | 2/2004 | Kidder | |
| 6,785,704 B1 | 8/2004 | McCanne | |
| 6,915,397 B2 | 7/2005 | Lubbers | |
| 6,983,362 B1 | 1/2006 | Kidder | |
| 7,020,665 B2 | 3/2006 | Douceur | |
| 7,054,892 B1 | 5/2006 | Phillips | |
| 7,065,618 B1 | 6/2006 | Ghemawat | |
| 7,107,419 B1 | 9/2006 | Ghemawat | |
| 7,130,870 B1 | 10/2006 | Pecina | |
| 7,191,358 B2 | 3/2007 | Fujibayashi | |

(Continued)

OTHER PUBLICATIONS

U.S. Appl. No. 10/993,536, filed Jun. 20, 2008, Office Action.

(Continued)

*Primary Examiner* — Mohammad Ali
*Assistant Examiner* — Griselle Corbo
(74) *Attorney, Agent, or Firm* — Workman Nydegger

(57) ABSTRACT

An improved system and method for flexible object placement and soft-state indexing of objects in a distributed object store is provided. A distributed object store may be provided by a large number of system nodes operably coupled to a network. A system node provided may include an access module for communicating with a client, an index module for building an index of a replicated data object, a data module for storing a data object on a computer readable medium, and a membership and routing module for detecting the configuration of operable nodes in the distributed system. Upon failure of an index node, the failure may be detected at other nodes, including those nodes that store the replicas of the object. These nodes may then send new index rebuilding requests to a different node that may rebuild the index for servicing any access request to the object.

20 Claims, 9 Drawing Sheets

U.S. PATENT DOCUMENTS

| | | |
|---|---|---|
| 7,239,605 B2 | 7/2007 | Dinker |
| 7,263,590 B1 | 8/2007 | Todd |
| 7,275,177 B2 | 9/2007 | Armangau |
| 7,293,024 B2 | 11/2007 | Bayliss |
| 7,305,530 B2 | 12/2007 | Daniels |
| 7,355,975 B2 | 4/2008 | Liu |
| 7,363,316 B2 | 4/2008 | Anderson |
| 7,363,326 B2 | 4/2008 | Margolus |
| 7,389,313 B1 | 6/2008 | Hsieh |
| 7,536,426 B2 | 5/2009 | Chen |
| 2002/0124013 A1 | 9/2002 | Loy |
| 2003/0028514 A1 | 2/2003 | Lord |
| 2003/0037149 A1 | 2/2003 | Hess |
| 2003/0105993 A1 | 6/2003 | Colrain |
| 2004/0088382 A1 | 5/2004 | Therrien |
| 2004/0111390 A1 | 6/2004 | Saito |
| 2005/0005200 A1 | 1/2005 | Matena |
| 2005/0010653 A1 | 1/2005 | McCanne |
| 2005/0015384 A1 | 1/2005 | Wehrman |
| 2005/0187992 A1 | 8/2005 | Prahlad |
| 2006/0026219 A1 | 2/2006 | Orenstein |
| 2006/0117212 A1 | 6/2006 | Meyer |
| 2008/0104218 A1 | 5/2008 | Liang |

OTHER PUBLICATIONS

U.S. Appl. No. 11/193,797, filed Jan. 25, 2008, Office Action.
U.S. Appl. No. 11/193,797, filed Jun. 27, 2008, Office Action.
U.S. Appl. No. 11/193,797, filed Oct. 1, 2008, Office Action.
U.S. Appl. No. 10/993,536, filed Dec. 15, 2008, Office Action.
U.S. Appl. No. 11/193,797, filed Feb. 23, 2009, Notice of Allowance.
U.S. Appl. No. 10/993,536, filed May 19, 2009, Office Action.
U.S. Appl. No. 10/993,536, filed Dec. 8, 2009, Office Action.
U.S. Appl. No. 10/993,536, filed Jun. 4, 2010, Notice of Allowance.

SYSTEM AND METHOD FOR A DISTRIBUTED OBJECT STORE

CROSS REFERENCE TO RELATED APPLICATIONS

This application is a continuation of application Ser. No. 10/993,536, filed Nov. 19, 2004, and entitled "SYSTEM AND METHOD FOR A DISTRIBUTED OBJECT STORE." The foregoing is incorporated herein by reference in its entirety.

FIELD OF THE INVENTION

The invention relates generally to computer systems, and more particularly to an improved system and method for a distributed object store.

BACKGROUND OF THE INVENTION

Distributed storage systems for a large number of immutable objects, perhaps on the order of billions of objects, may be traditionally implemented on fault-tolerant systems designed to provide a high-level of system reliability and availability. Such systems may be implemented with fixed placement of replicated objects and replicated index servers. Upon recognizing when a node or disk may be lost, the system may need to repair the object, for example, by striving to reestablish the desired number of replicas for that object in the system.

Prior schemes, as a result, had some limitation on where objects could be placed. Previous systems usually put object replicas into a few predetermined locations. There are several known problems with this approach. First of all, such an approach does not allow flexible use of available space on the storage nodes in the distributed system. The situation may arise where a particular object has been predetermined to be placed on a storage node that happens to be full. As a result, maintenance tasks may be required to be performed in order to create space on the storage node, such as splitting up the node, or using another node. Another problem with this approach is that it may prevent performing optimizations such as co-locating objects. For instance, it may be advantageous to reduce access latency by placing objects on the same storage node that may be frequently accessed together. However, this may not be allowed by a system implemented with fixed placement of replicated objects.

Furthermore, there are other problems that may arise with schemes limiting placement of object replicas to a few predetermined locations, for instance, when repairing an object with a replica lost on a failed storage node. Because the scheme may force objects to be placed on particular nodes and all but one of the particular storage nodes may be failed, there may be little choice left where to place the new copies for the objects that replace those lost by the node failures. If all the copies of objects must be placed on a single remaining node, there may be limitations of either the network bandwidth or the disk bandwidth for how fast the new objects may be written to this single remaining node.

There are similar problems with a fixed placement scheme when a storage node fails. Only a few other storage nodes may participate in repairing the object by copying the replicas to other storage nodes. As a consequence, object repair may take a long time due to disk or network bandwidth limitations, and further crashes during this vulnerability window may cause a loss of objects. Moreover, a fixed placement scheme cannot support more flexible placement policies required by an application. For example, an application may have a better knowledge of the semantics of the objects and may prefer to place certain object replicas together on certain disk storage nodes to reduce access latency.

Another limitation to previous schemes is that all or part of an index residing on a node may be lost when the node fails. Previous schemes may replicate the indices so that when an index node fails, there may be a replica that may be used to continue to locate objects. Also previous schemes have tried to persist the indices on disk so that during transient failures such as node reboots, an index may be restored from disk after the node is operable. Because indices may be concurrently read and written, the indices are typically replicated also. In general, such schemes may require complicated fault-tolerant approaches to maintain the indexes and may incur runtime overhead for maintaining replicated indexes or persistent indexes.

What is needed is a way for providing a high-level of availability and reliability for a distributed object store without resorting to fault-tolerant platforms with fixed placement of replicated objects and replicated index servers. Any such system and method should allow flexible placement of replicated objects and indexes while reducing the time and expense for maintaining the system.

SUMMARY OF THE INVENTION

Briefly, the present invention may provide a system and method for flexible object placement and soft-state indexing of objects in a distributed object store. A distributed object store may be provided by a large number of system nodes operably coupled to a network. A client executing an application may also be operably coupled to the network. A system node provided may include an access module for communicating with a client, an index module for building an index of a replicated data object, a data module for storing a data object on a computer readable medium, and a membership and routing module for detecting the configuration of operable nodes in the distributed system. A system node may be configured as an index node that may have an index module but not a data module. A system node may also be configured as a data node that may have a data module but not an index module.

A replicated data object may be flexibly placed anywhere in the system and there may be a policy for specifying replication and placement of the replicated data object in the distributed system. The policy may allow random placement of data objects or may specify application-specific placement such as co-location of data objects. The policy may also specify the number of replicas for a given object which may be different from object to object.

The invention may also provide soft-state indexing of objects by keeping the state for an object index in main memory and without needing the index to be replicated or persistently stored. Upon failure of an index node, the failure may be detected at other nodes, including those nodes that store the replicas of the object. These nodes may then send new index rebuilding requests to a different node that may rebuild the index for servicing any access request to the object.

Advantageously, as long as one replica of an object exists, the system and method may restore the number of desired copies in the system. Furthermore, either a node with objects already stored on it or a computer readable medium with objects already stored on it may be operably coupled to the distributed object store and the distributed object store may automatically discover the data objects on the node or computer readable medium, build an index for servicing access requests, and create the desired number of replicas in the object store.

Other advantages will become apparent from the following detailed description when taken in conjunction with the drawings, in which:

DETAILED DESCRIPTION

Exemplary Operating Environment

Figure 1:
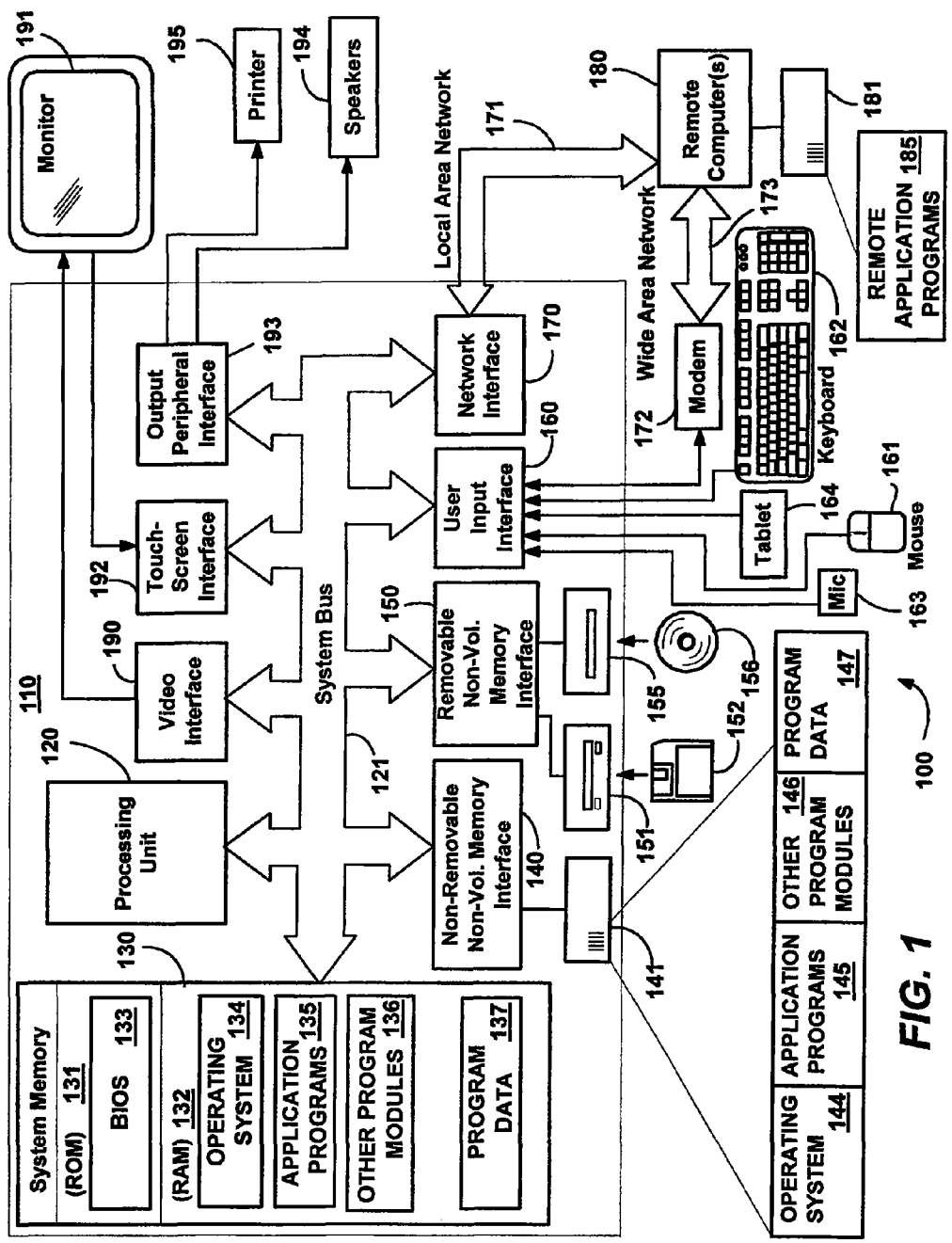
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Object Placement in a Distributed Object Store

The present invention is generally directed towards a system and method for a distributed object store. More particularly, the present invention provides object-level mirroring, flexible object placement and in memory indexing of objects in a distributed object store. Data object placement may flexibly support both random and application-specific placement policies. By using a soft-state approach for indexing, an index for a data object may be kept in main memory without needing to be replicated or persistently stored. In the event an index may be lost, then index repair may be driven by system nodes and the index may be rebuilt from the data objects stored on the system nodes. As long as there may be a last copy of the object available, the index rebuilding process may be initiated. Eventually the object may be repaired to the desired replication degree and the index may be rebuilt. Moreover, system nodes or storage containing data objects may be plugged into the distributed data network and their data objects will be automatically discovered and replicated. As will be understood, the various block diagrams, flow charts and scenarios described herein are only examples, and there are many other scenarios to which the present invention will apply.

Figure 2:
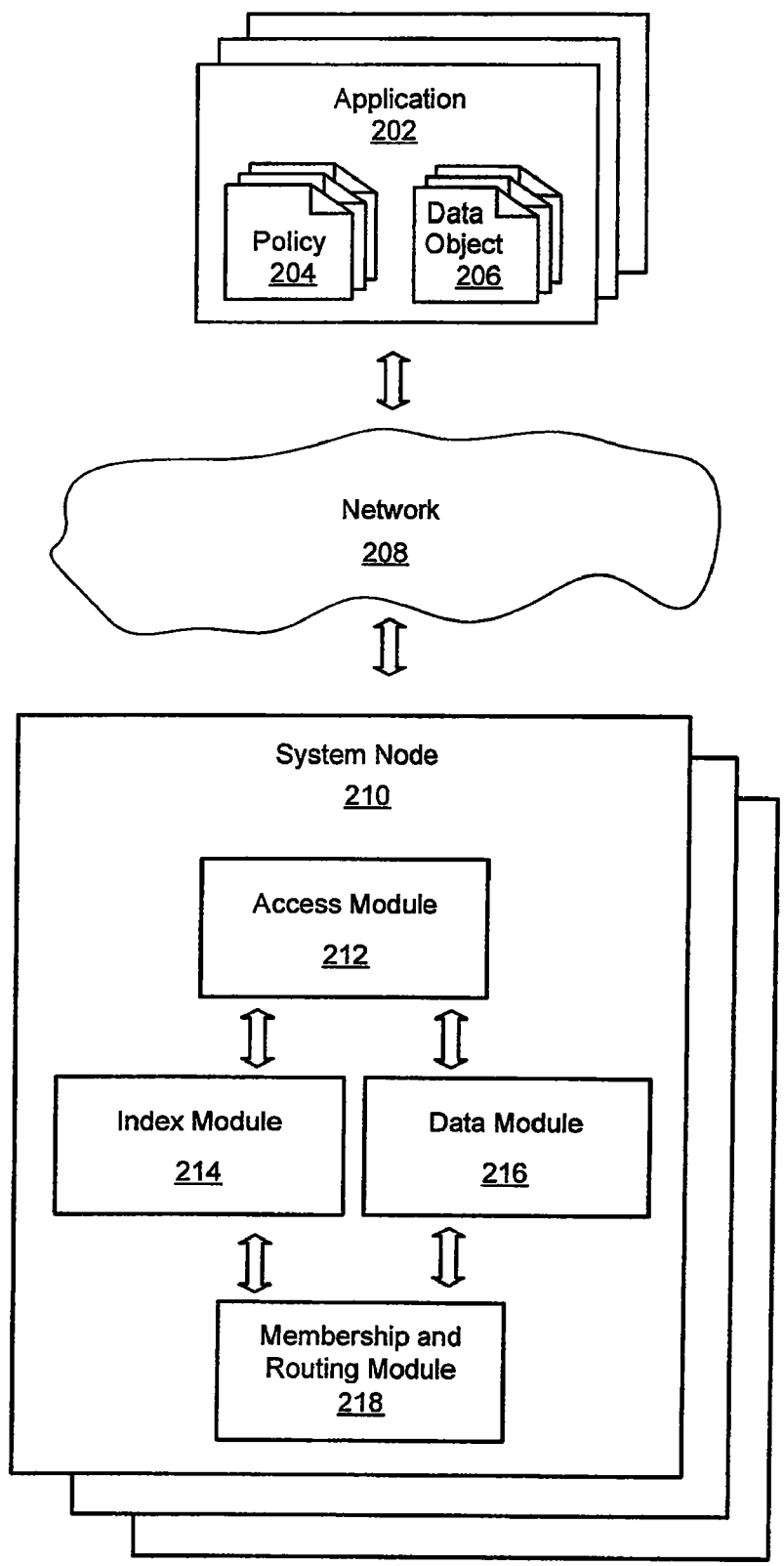
FIG. 2 is a block diagram generally representing an exemplary architecture of system components for a distributed object store, in accordance with an aspect of the present invention.

Turning to FIG. 2 of the drawings, there is shown a block diagram generally representing an exemplary architecture of system components for a distributed object store. Those skilled in the art will appreciate that the functionality implemented within the blocks illustrated in the diagram may be implemented as separate components or the functionality of several or all of the blocks may be implemented within a single component. For example, the functionality for the index module 214 may be included in the same component as the data module 216. Or the functionality of routing in the membership and routing module 218 may be implemented as a separate component.

As used herein, an object store may mean a large distributed system of operably coupled nodes. In various embodiments, one or more applications 202 may be operably coupled to one or more system nodes 210 by a network 208. In general, an application 202 may be any type of executable software code such as a kernel component, an application program, a linked library, an object with methods, and so forth. In one embodiment, an application may execute on a client computer or computing device, such as computer system environment 100 of FIG. 1 which may be operably coupled to one or more system nodes 210 by the network 208. An application 202 may include one or more policies 204 and one or more data objects 206. A policy 204 may generally include instructions for data object placement and replication in the distributed object store.

Data object replicas may be placed on any system nodes. The replication degree, or number of replicas, may be specified for an individual data object and the replication degree may be different from object to object. A data object 206 may represent any type of data for storage in the distributed object store. For example, a data object may be any type of file(s), including a document, spreadsheet, data base, executable code and so forth. An object within the distributed object store may be immutable meaning the object may not be modified once placed into the distributed object store. In order to change an object, a new object may be created and the new object may be put into the object store. In one embodiment, the old object may be subsequently deleted.

The network 208 may be any type of network such as a local area network (LAN), a wide area network (WAN), or other type of network.

A system node 210 may be any type of computer system or computing device such as computer system environment 100 of FIG. 1. A system node 210 may include an access module 212, an index module 214, a data module 216, and a membership and routing module 218. Each of these modules may also be any type of executable software code such as a kernel component, an application program, a linked library, an object with methods, or other type of executable software code. A system node 210 containing an operable index module 214 shall be called an index node. A system node 210 containing an operable data module 216 shall be called a data node. A system node may be an index node, a data node, or both.

The access module may only be present on some system nodes and may be responsible for communicating with clients. The index module may also be only present on some system nodes and may be responsible for indexing a subset of data objects stored in the object store. The logical space of object identifiers may be partitioned into subsets and each index node may be responsible for indexing data objects whose identifiers belong to a given subset. For example, if the object identifiers are randomly chosen globally unique identifiers (GUIDs), then the subsets of object identifiers may be partitioned so that the data objects referenced by the object identifiers may be evenly distributed among the subsets of object identifiers. In this way, responsibility for tracking a large number of objects may be evenly spread among the index nodes.

An index built by an index module may include information about a replica set for each object such as an indication of system nodes where replicas of the object may be stored. For instance, an index may maintain a list of locations or pointers to all the copies of a data object. There may also be a replication degree defined for each object that specifies the number of copies of the object desired to be stored in the distributed object store. The replication degree may be stored as metadata associated to every copy of a data object. During some transient state or condition, there may be fewer copies than the number of copies specified by the replication degree due to node failure, in which case any copies of the data objects on failed nodes may no longer be available for access. It may be the responsibility of the index module to track such a situation and remedy it, for example, by directing creation of new copies until the desired number of available replicas may be stored in the object store.

The data module 216 may also be only present on some system nodes and may be responsible for keeping track of what data objects may be stored on the computer storage media of that node. The data module may also keep track of the index nodes responsible for indexing those data objects as well. In the event that an index node may fail, data modules may be notified by the membership and routing module 218 and each data module may determine a new index node that may be responsible for indexing the data objects. In one embodiment, the data module may then report to that index module what data objects it should be indexing.

When receiving a notification of a new configuration from the membership and routing module 218, a node in the system may compute from the membership of the new configuration which index nodes may be responsible for which data objects stored in the object store. The node may then check the new configuration to detect which of these index nodes may have failed. For example, a data module may use the membership information of which index nodes are operable to compute which index node may be responsible for indexing a particular data object in order to detect any changes resulting from the new configuration.

The membership and routing module 218 may be present on every system node and is responsible for providing eventual and global detection of any new configuration of operable system nodes, including index nodes and data nodes. There may be several embodiments for the membership and routing module that may provide eventual and global detection of new configurations. One such embodiment may be based on a peer-to-peer infrastructure such as XRing which may be further described in "XRing a Robust and High-Performance P2P DHT", Microsoft Research Technical Report No. MSR-TR-2004-93 by Z. Zhang, Q. Lian, Y. Chen. Another embodiment may be based on the Paxos distributed consensus algorithm which may be further described in "The Part-Time Parliament", *ACM Transactions on Computer Systems*, 16, 2 (May 1998), 133-169 by Lamport, L. [Paxos].

As used herein eventual detection means that after an event has happened that may effect a new configuration of operable system nodes, such as a node fails or a node is plugged into the object store, each operable system node may be subsequently notified of the new configuration after the new configuration becomes stable. As used herein, global detection means that every operable node will be notified about any new configuration of system nodes. Such notification may be provided by listing a new configuration of operable nodes in one embodiment so that every time there is a change, the live nodes in the system may be informed about the new configuration. For example, if an indexing node may fail, then a membership and routing module may detect this node failure and send a notification to the remaining indexing nodes and data nodes that the particular indexing node failed along with a list of the operable system nodes in the new configuration.

In this fashion, the system nodes may be networked together to behave as a large distributed object store. The operations that may be supported as an interface to the object store may be an object checkin operation and an object checkout operation. To store an object in the object store, a checkin API may be provided. To retrieve an object, a checkout API may be provided. Further operation such as deleting an object, may also be supported using an object deletion API.

Each data object may have an object identifier to identify the data object. An object identifier may a filename, a number, a string, a hash of the object content, a globally unique identifier that may be randomly chosen so that the probability of collision is extremely small, or any other type of key. In one embodiment, such an object identifier for a data object may be returned by a checkin operation. In an alternate embodiment, such an object identifier may be supplied as part of the checkin operation. The object identifier may be used to identify an object, for example, for a checkout operation. Each object identifier may correspond, for example, to a system node that may own that object identifier. This system node may be referred to as the root of the object. The assignment of a root node to a given object identifier may be made, for instance, by a distributed hash table (DHT).

In one embodiment of the present invention, the identification space of data objects may be partitioned by the membership and routing module using a hash function that may create several zones, each of which may have a system node for indexing data objects assigned to that zone. A data object may be referred to herein as rooted at a particular index node if the partitioning of the identification space assigns the identifier of the data object to that index node.

Figure 3:
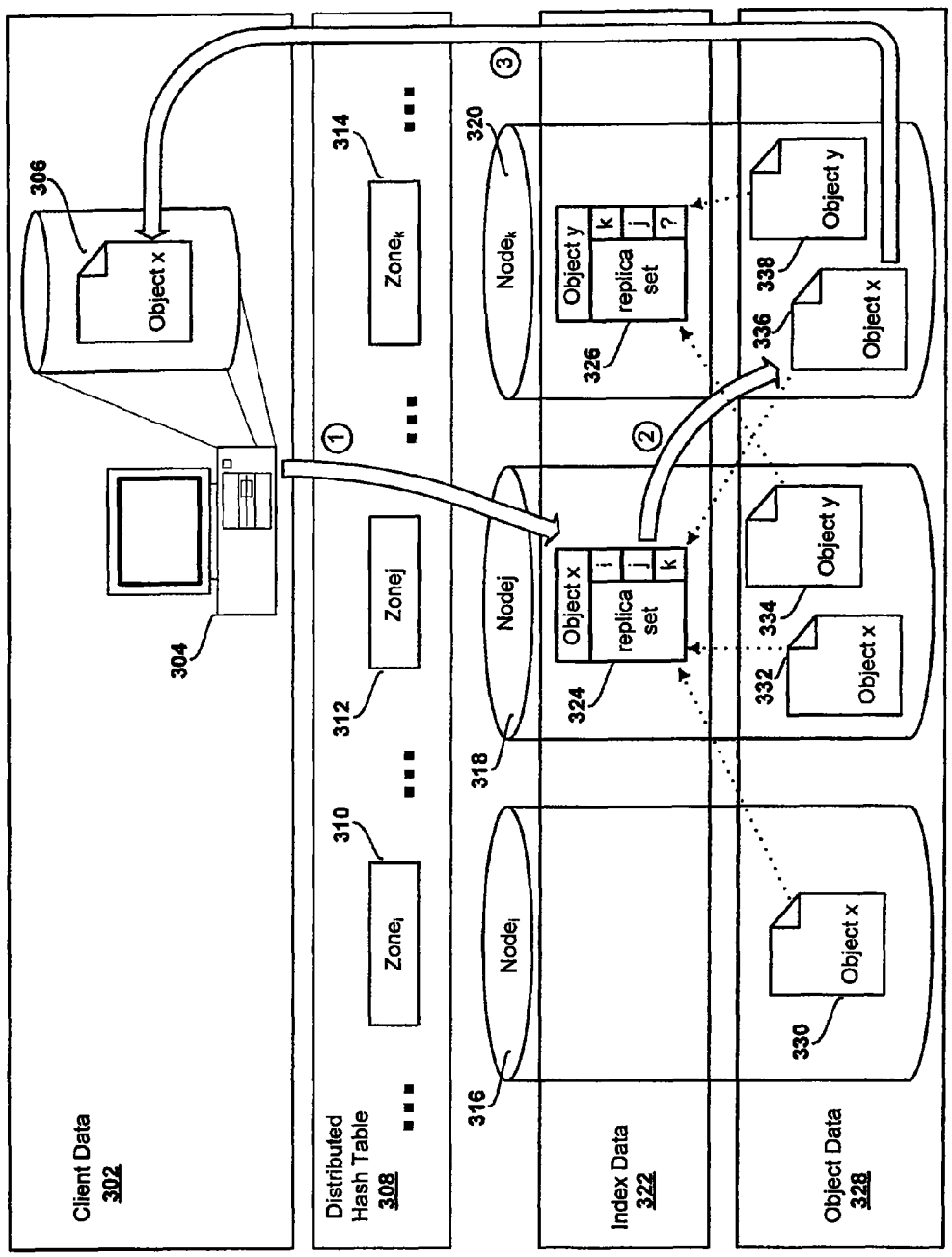
FIG. 3 is a an exemplary illustration generally depicting a logical representation of a distributed data store in one embodiment where the identification space for the data objects may be partitioned by a hash function, in accordance with an aspect of the present invention.

FIG. 3 presents an exemplary illustration generally depicting a logical representation of a distributed data store in one embodiment where the identification space for the data objects may be partitioned by a hash function into several zones, such as $Zone_i$ 310, $Zone_j$ 312 $Zone_k$ 314, of distributed hash table 308. For each of these zones, there may be a corresponding system node with a computer storage medium, such as $Node_i$ 316, $Node_j$ 318, and $Node_k$ 320. The computer storage medium of each system node may generally include either index data 322 or object data 328 or both. For example, the computer storage medium of $Node_i$ 316 may only include object data, specifically object x 330. The index data 322 stored on a computer storage medium may include information about a replica set for each object such as an indication of system nodes where replicas of the object may be stored. For example, index data for object x 324 stored on $Node_j$ 318 may indicate that replicas of object x may be stored on $Node_i$ 316, $Node_j$ 318, and $Node_k$ 320. Each of these nodes may include a stored replica of object x such as a replica of object x 330 stored on $Node_i$ 316, a replica of object x 332 stored on $Node_j$ 318, and a replica of object x 336 stored on $Node_k$ 320.

In general, an index module on a node may hold the indices for data objects rooted at that node. The data module on a node may hold data objects and may also maintain reverse tables that may include references that point to the root nodes of those data objects stored. For instance, FIG. 3 shows dotted arrows from the replica of data object y 334 and the replica of data object y 338 pointing to index 326 for object y stored on $Node_k$ 320.

Object Checkout

When checking out an object, a request may generally be first routed to an index module of the root node for the data object, then the index module may select one replica in its index so that the request can be routed to the data module of the node holding the replica of the object. Then the data module may transfer the data object back to the requestor.

For example, a checkout operation may be used to transfer a data object, such as object x, from the data store to an application executing on a client, such as client 304. The client may first find an index node which may indicate what nodes may store a replica of object x in the data store.

In one embodiment, client 304 may send a request to a node in the distributed data store for a copy of the data object. FIG. 3 illustrates such a request sent from client 304 to $Node_j$ 318. The node receiving the request may obtain membership information and compute which index node may be responsible for maintaining index information for that data object requested. If the system node which received the request is not the index node which is responsible for maintaining index information for that data object requested, the system node may then forward the request to an index node responsible for maintaining index information for that data object requested. The index node may then choose a data node that may have a replica of the requested data object from the index and send a request to that data node to transfer a copy of the requested data object to the client. For example, FIG. 3 illustrates such a request sent from $Node_j$ 318 to $Node_k$ 320. Upon receiving the request, the data node may then transfer a copy of the data object to the client, as illustrated by $Node_k$ 320 in FIG. 3 transferring the replica of object x 336 to the client to be processed or stored as object x 306.

In an alternate embodiment, a client may itself find which index node may be responsible for maintaining index information for the desired data object by obtaining membership information and computing which index node may be responsible for maintaining index information for that data object. Upon finding which index node may be responsible for maintaining index information for that data object requested, the client may then send a request to that index node to transfer a copy of the requested data object to the client. The index node may then choose a data node that may have a replica of the requested data object from the index and send a request to that data node to transfer a copy of the requested data object to the client.

In yet another implementation, the client 304 may send a request to a node in the distributed data store for a copy of the data object. The node receiving the request may obtain membership information, compute which index node may be responsible for maintaining index information for that data object requested, and forward the request to the index node. The index node may in turn choose a data node that may have a replica of the requested data object from the index and may respond to the client with the address of the data node where a replica of the object may reside. The client may then send a request to that data node to transfer a copy of the requested data object to the client. Those skilled in the art will appreciate that other implementations are possible, including employing a combination of the methods discussed above.

Figure 4:
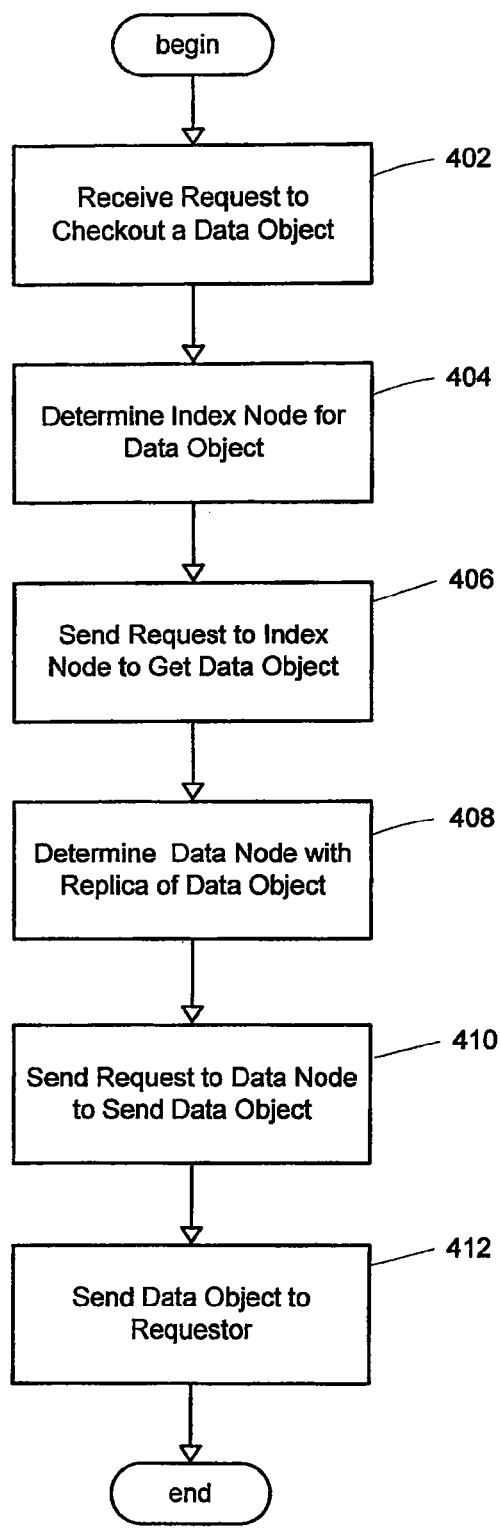
FIG. 4 is a flowchart generally representing the steps undertaken in one embodiment during checkout of a data object from the distributed data store, in accordance with an aspect of the present invention.

FIG. 4 presents a flowchart generally representing the steps undertaken in one embodiment during checkout of a data object from the distributed data store. At step 402, a request may be received to checkout a data object. For instance, an application executing on a client may send a request to a node in the distributed data store to checkout a data object from the distributed data store. Any node in the distributed data store may receive a request to checkout a data object. Upon receiving the request, the node may determine the index node for the data object at step 404. In one embodiment, the node receiving the request may obtain membership information and compute which index node may be responsible for maintaining index information for that data object requested. In another embodiment, a client may itself determine which index node may be responsible for maintaining index information for the desired data object by obtaining membership information and computing which index node may be responsible for maintaining index information for that data object.

Either way, the request may then be sent at step 406 to the index node to get the data object. The request may generally be first routed to an index module of the root node for the data object for determining a data node with a replica of the data object. At step 408, a data node with a replica of the data object may be determined. In one embodiment, the index module may select one replica in its index so that the request can be routed to the data module of the node with the replica. At step 410, the request to send the data object may be sent to the data node with the replica. Upon receiving the request, the data node may send the data object to the requester at step 412. After the data object has been sent the requester, processing for checkout of a data object is finished.

Object Checkin

Figure 5:
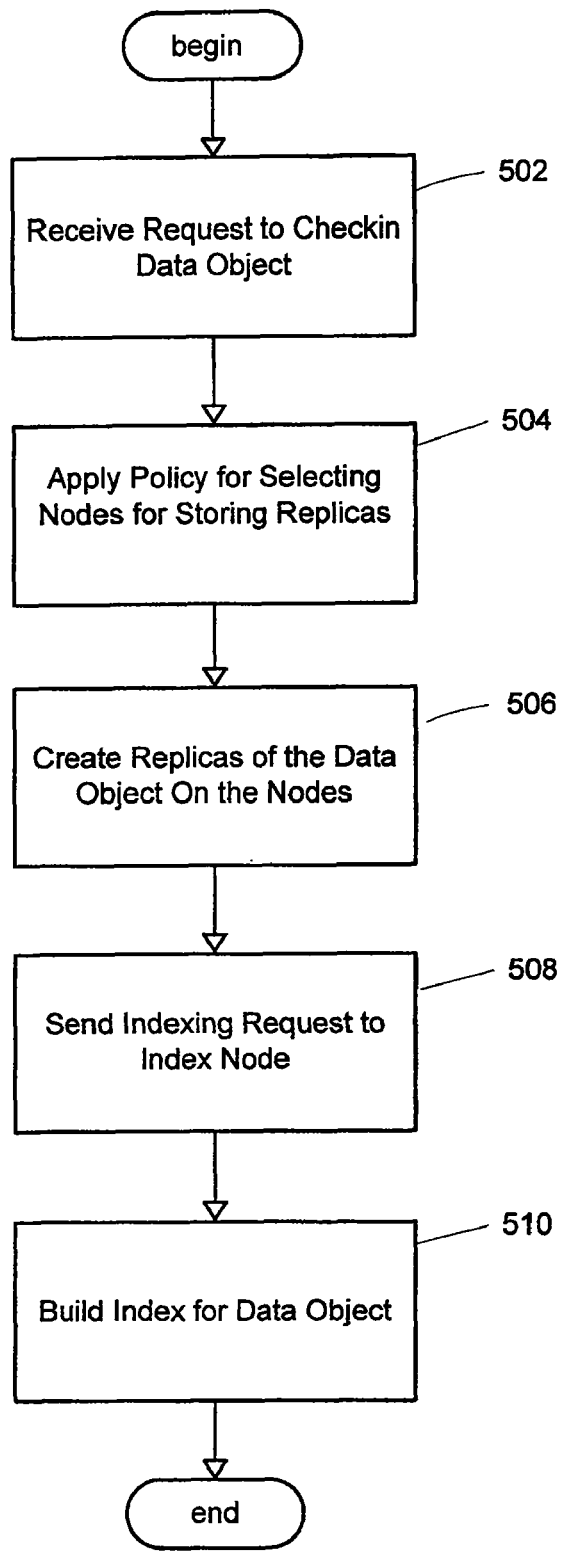
FIG. 5 is a flowchart generally representing the steps undertaken in one embodiment during checkin of a data object into the distributed data store, in accordance with an aspect of the present invention.

A new data object may also be checked into the data store. For instance, a client may create a new data object to be checked in the data store. FIG. 5 presents a flowchart generally representing the steps undertaken in one embodiment during checkin of a data object into the distributed data store. At step 502, a request may be received to checkin a data object. In one embodiment, the request may be received by an access module. The requestor, such as an application executing on a client, may have a policy for storing replicas in the distributed data store. For example, the policy may specify a replication degree, which means herein the desired number of replicas to be stored in the distributed data store. The policy may also specify whether data objects may or may not be co-located or may specify other object placement rules. For example, random selection may be one instance of a policy. Or the policy may be more focused and take into account the loading of the data nodes, the amount of spare capacity, co-location requirements, distribution of object replicas across failure units such as machines and racks, and so forth. Any policy for selecting nodes for placement of the replicas may be applied at step 504. Then replicas of the data objects may be created on the nodes at step 506. In one embodiment, an access node may copy the object to each of the k data nodes in order to create the k distributed replicas. An indexing request may be sent at step 508 to the index node by each data node after creating a replica. Each data node may first determine the index node for that object based upon the object identifier and the node's knowledge of the membership of operable index nodes. An index may be built for the data object by the index node at step 510. As indexing request messages are received by the index node, the index node may build the index for the object. In one embodiment, the index node may gather pointers to the locations of the data objects and store them in volatile memory. After all k messages have been received, the index collectively may have k entries which point to the k replicas. After building the index, processing is finished for checkin of a data object in the object store.

Object Deletion

An existing object may also be deleted via the object deletion API. When a client requests to delete an object, the deletion requests may be forwarded to the index node of the object via the membership and routing layer. The index node may then mark the object index as to be deleted, and send the deletion requests to all the data nodes pointed to by the object index. When a data node receives the deletion request, it may delete the object replica stored on it and send a deletion acknowledgment back to the index node. When the index node receives the acknowledgment, it may mark that the corresponding replica of the object has been deleted. If the index node does not receive the deletion acknowledgment from a data node for a certain period of time, it may resend the deletion request to avoid the request or the acknowledgment being lost.

It is also possible that some data node contains a replica of the object being deleted but the index node of the object is not aware of this replica, such as may happen if an indexing request has not yet been sent. This may typically occur when the data node failed for a period of time and later recovered from the failure. In this situation, the data node may later send an indexing request to the index node as directed by an index repair operation. When the index node receives the indexing request and notices that the object index has been marked as deleted, it may send the deletion request to the data node to delete the replica.

After the index node learns that all the replicas of the object that it is aware of have been deleted, it may further wait for a period of time in which no more indexing requests may be received for this object. Eventually, the index node may finally remove the index of the object completely from the system.

Index State Machine and Triggering Repair

Figure 6:
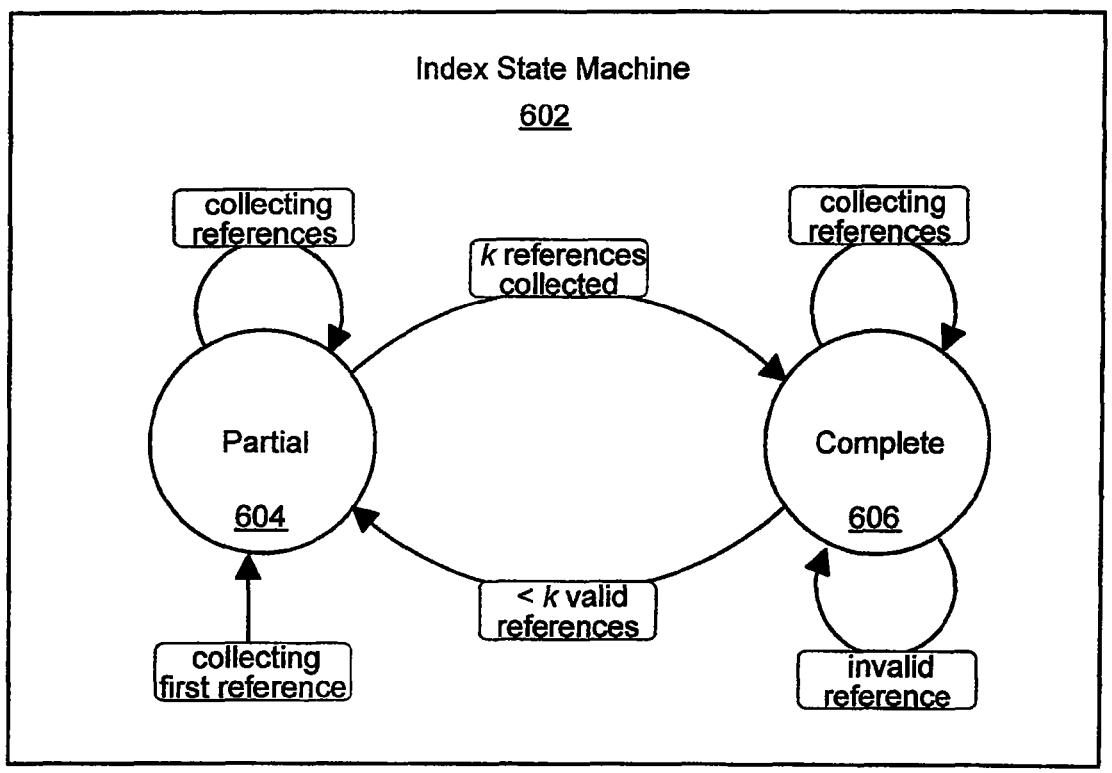
FIG. 6 is an exemplary state diagram generally illustrating the states of an index entry for a data object, in accordance with an aspect of the present invention.

For each data object an index node may be aware of, the index node may keep a state machine. FIG. 6 presents an exemplary state diagram generally illustrating the states of an index for a data object. More particularly, the state diagram illustrates two states of an index for a given object and also shows the conditions enabling the transitions between the states.

Prior to receiving the first index request message for a data object, the state machine may not yet exist because the index node may not be aware of the data object at all. A data node may then send an index request message that may convey an object identifier, the desired replication degree, and the location of this copy of the data object. When the first index request message may be received, a state machine 602 for the data object may be instantiated in a partial state 604. For each message received from a node that created a replica of the data object, the state machine 602 may remain in the partial state 604 until at least k references to objects from messages sent by each of the nodes that created a replica of the data object are collected by the index module. Upon receiving the $k^{th}$ message, the state machine 602 may transition from the partial state 604 to the complete state 606. The state machine 602 may remain in the complete state and continue to collect references to objects until fewer than k references become valid. For example, a reference can become invalid because a node with a replica fails. A notification may be received from a membership and routing module that a data node failed and that the node was a location of one of the object replicas for which the index node is responsible for indexing. When there is an invalid reference the state machine 602 may transition to the partial state 604 and may remain in the partial state 604 until at least k references are valid.

Whenever the state machine enters the partial state 604, a timer may be started that may specify a period of time to remain in the partial state 604 before commencing data repair procedures. If the timer expires before the state machine 602 transitions to a complete state 606, then data repair procedures may be initiated. Either a failed node was not restored before expiration of the timer or the index node may only be aware of fewer than k replicas in the object store.

The timer may be configurable for a desired amount of time. In one embodiment, the timer may serve two purposes. First, the timer allows for a period of propagation delay to occur before data repair procedures are initiated. This may account for the period of delay between receiving the first message for indexing a data object and receiving the $k^{th}$ message for indexing the data object. The second purpose for the timer may be to allow for a period of time for restoration of transient node failures. This may account for the period of time that it takes for a node in the system to reboot and may avoid unnecessary churn in the system.

Index Repair

Figure 7:
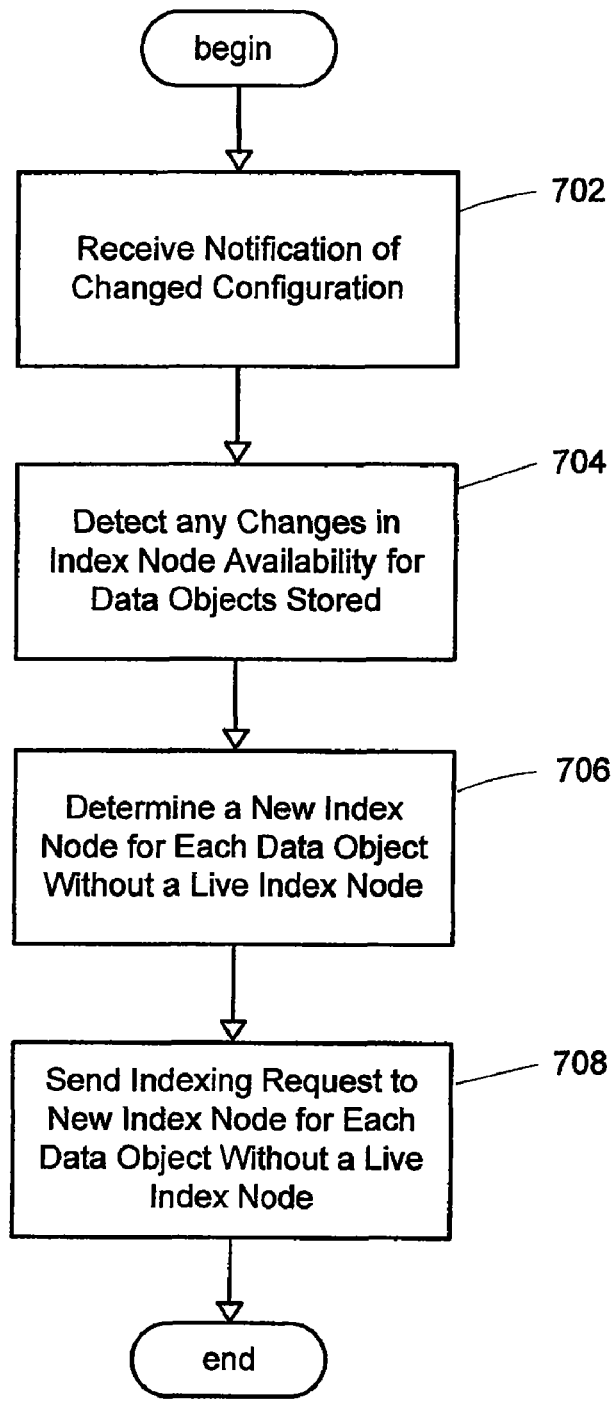
FIG. 7 is a flowchart generally representing the steps undertaken in one embodiment by a data module when a failed index node may be detected in the distributed data store, in accordance with an aspect of the present invention.

An index node may fail in the distributed data store for any number of reasons. Such failure of an index node may be detected by each data node that has at least one object that may be indexed by the failed index node. FIG. 7 presents a flowchart generally representing the steps undertaken in one embodiment by a data module when a failed index node may be detected in the distributed data store. At step 702 notification of a changed configuration may be received. The membership and routing layer may detect a failed node and may send notification to any live nodes of the new configuration. At step 704, any changes in availability of index nodes for data objects stored by the data node may be detected. For instance, the data node may use the membership information of operable nodes in the new configuration to compute the index node for each of its object identifiers to discover if any objects were indexed by a failed node. At step 706, a new index node may be determined for each data object without a live index node. Using the membership information communicated by the membership and routing module, the data module may compute which index node may be responsible for maintaining index information for that data object. At step 708, an indexing request may be sent to each new index node for each data object without a live index node. After sending any indexing requests, processing is finished for the data node. Upon receiving a first index request, an index node may begin building an index for the data object.

This data repair process may be interrupted at any point in time. Multiple failures may occur in the system at arbitrary times. For instance, some data nodes may fail and some index nodes may fail during the data repair process. In various embodiments where index node functionality is co-located on the same physical node as data node functionality, there may be simultaneous failures. Advantageously, the system may be repaired for these types of failures as long as there may be at least one last copy of an object on a node in the distributed data store.

Handling the Addition of Data Storage

Figure 8:
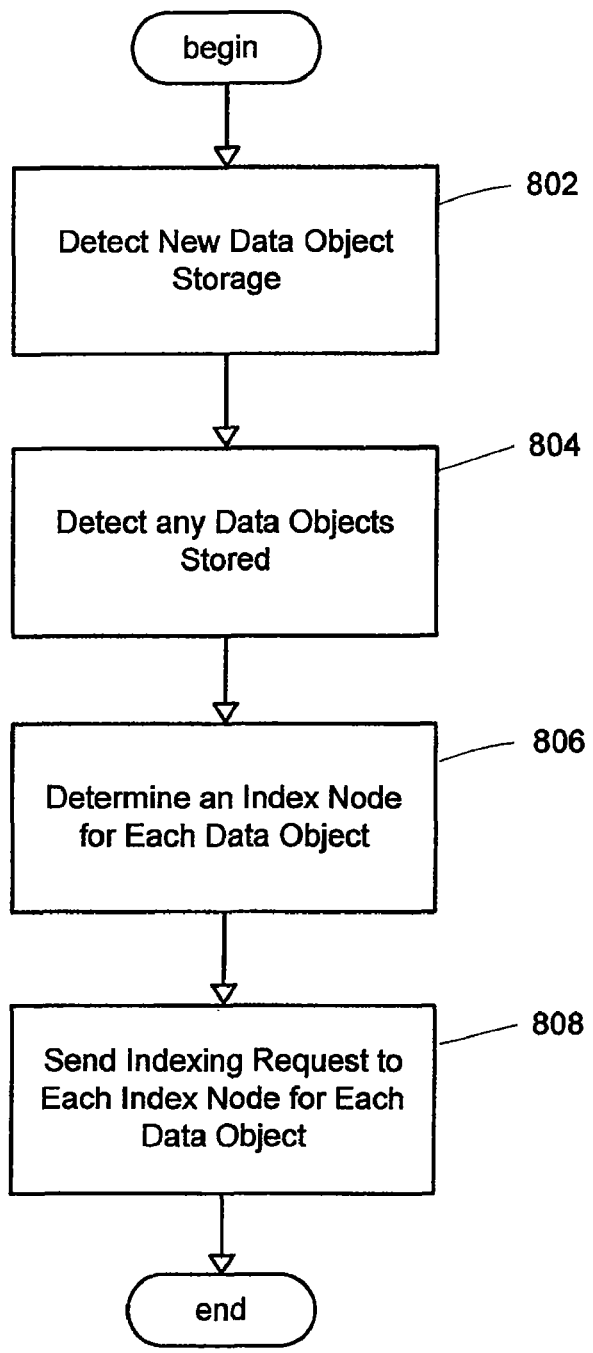
FIG. 8 is a flowchart generally representing the steps undertaken in one embodiment by a data module when new data object storage may be detected in the distributed data store, in accordance with an aspect of the present invention.

FIG. 8 is a flowchart generally representing the steps undertaken in one embodiment by a data module when a new configuration may be detected in the distributed data store. At step 802, a new configuration may be detected. For example, either a new node with data objects may be added to the distributed data store or a computer storage medium with data objects may be added to an operable data node in the distributed data store. Upon initialization, the new node may scan the data objects stored on its computer storage media to discover any stored data objects. In another embodiment, a new computer storage medium may be loaded on an existing data node and the data node may detect the new computer storage medium for instance by its plug and play capabilities. In either case, any data objects stored on the node may be detected at step 804. At step 806, an index node may be determined for each data object. And at step 808, an indexing request may be sent to each index node for each data object detected. After sending any indexing requests, processing is finished for the data node. Upon receiving a first index request, an index node may begin building an index for the data object.

After the timer may expire on the index node, the index node may notice that it is aware of fewer than k replicas and may begin data repair to create the desired number of replicas as described below in conjunction with FIG. 9. After creating the desired number of copies, the copies may then be reliably stored in the distributed data store. This may simply allow effective seeding of the store which may be useful in many scenarios such as out of band replication. For example, computer readable media may be shipped between data centers and the data objects from the first data center may be created on the object store in the second data center by plugging in the shipped disks.

Object Replica Repair

Figure 9:
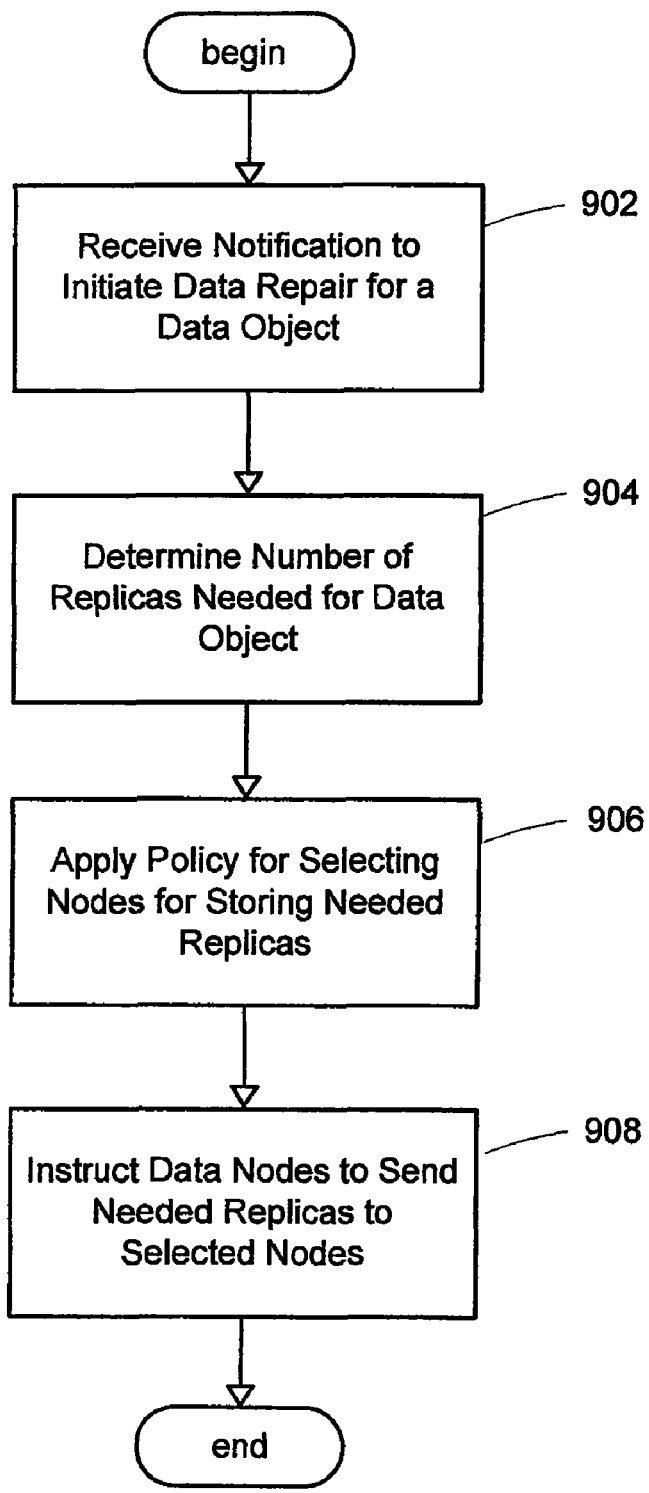
FIG. 9 is a flowchart generally representing the steps undertaken in one embodiment by an index module when fewer than the desired number of replicas may be detected in the distributed data store, in accordance with an aspect of the present invention.

FIG. 9 is a flowchart generally representing the steps undertaken in one embodiment by an index module when fewer than the desired number of replicas may be detected in the distributed data store. In this case, repair of the data object may be triggered when the timer expires while the state machine for the index remains in the partial state. At step 902, notification may be received to initiate data repair for a data object. At step 904, the number of replicas needed for the data object may be determined. For instance, the index node may be aware of k−2 replicas and may determine that two more replicas may need to be created. A policy for selecting nodes for storing needed replicas may then be applied at step 906. Data nodes may be instructed to send copies of needed replicas to the selected data nodes at step 908.

The repair process may proceed in parallel for a large number of data objects. For example, the new copies may be placed throughout the system in parallel by choosing various seed copies distributed throughout the system from which to create the new copies of the needed replicas. Thus data objects may be read and written in parallel using the available bandwidth of the system. After instructing the data nodes, an index node may receive a first index request and may then begin building an index for the data object.

Thus the present invention may advantageously support plugging a node or computer readable medium with stored objects into the distributed object store and the distributed object store may automatically discover the data objects on the node or computer readable medium, build an index for servicing access requests, and create the desired number of replicas in the object store. This may be particularly useful for removing disks that may include data objects written on them and plugging them into another system for seamlessly propagating the data objects in another data center or for making backup versions.

As can be seen from the foregoing detailed description, the present invention provides an improved system and method for flexible object placement and in memory indexing of objects in a distributed object store. The actual location of the replicas of an object may either be specified by an application's object placement policy or may be selected at random by the system. This policy-driven placement scheme may shorten the data repair time and at the same time may be flexible enough to support an application's special placement policies. Furthermore, by using a soft-state approach for indexing, an index for a data object may be kept in main memory without needing to be replicated or persistently stored. In the event an index may be lost, then index repair may be driven by system nodes and the index may be rebuilt from the data objects stored on the system nodes. As long as there may be a last copy of the object available, the index rebuilding process may be initiated and the system and method may restore the number of desired copies of the object in the distributed object store. As a result, the system and method provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer program product for performing a method in a distributed computer system capable of redundantly storing a plurality of data objects, the method for detecting an index failure and repairing the index, the computer program product comprising one or more computer-readable storage media having encoded thereon computer-executable instructions which, when executed upon one or more computer processors, perform a method comprising:

storing a replicated data object on a computer storage medium;

building an index of a replicated data object in memory of a first system node;

a data node that has at least one object which is indexed by the first system node detecting that the first system node has failed;

a membership and routing layer detecting a failed node;

receiving notification of a changed configuration;

the membership and routing layer sending notification of the changed configuration to at least one live data node;

detecting a change in an availability of an index node for data objects stored by the live data node;

determining that a time period for propagation delay has expired and, upon determining the time period expired, initiating data repair procedures;

upon determining the time period has expired, determining a new index node for each data object without a live index node;

a data node having at least one object indexed by the first system node determining, by using membership information of operable nodes in the new configuration, a second system node for rebuilding of the index for the replicated data object;

computing a responsible index node for maintaining index information for the replicated data object using the membership information;

sending an indexing request to the second system node for at least one object without a live index node;

rebuilding the index for the replicated data object; and storing the rebuilt index in computer storage media corresponding to memory of a second system node.

2. The computer program product of claim 1 wherein, when executed, the computer-executable instructions further perform sending an indexing request from a system node storing a replicated data object to the first system node, the indexing request including the location of the replicated data object.

3. The computer program product of claim 1 wherein, when executed, the computer-executable instructions further perform receiving notification of a configuration of operable system nodes.

4. The computer program product of claim 1 wherein, when executed, the computer-executable instructions further perform sending an indexing request to the second system node, the indexing request including the location of the replicated data object.

5. The computer program product of claim 1 wherein, when executed, the computer-executable instructions further perform instantiating a state machine for indicating the state of rebuilding the index of the replicated data object, the state machine maintaining information indicating whether a required number of copies of the replicated data object have been indexed.

6. The computer program product of claim 1 wherein, when executed, the computer-executable instructions further perform receiving notification of expiration of a timer indicating that fewer than the desired number of replicas are indexed.

7. The computer program product of claim 1 wherein, when executed, the computer-executable instructions further perform determining the number of replicas needed for the replicated data object.

8. The computer program product of claim 1 wherein, when executed, the computer-executable instructions further perform g determining that all replicas needed for the replicated data object have been created upon receiving a number of notifications greater than or equal to the desired replication degree for the data object.

9. The computer program product of claim 1 wherein, when executed, the computer-executable instructions further perform applying a policy to select the system nodes for storing replicas of the replicated data object.

10. The computer program product of claim 1 wherein, when executed, the computer-executable instructions further perform sending a request to a subset of system nodes having copies of a data object to send replicas of the data object to other selected system nodes.

11. A system for detecting an index failure and repairing the index, the system comprising one or more computer processors and one or more computer-readable storage media having encoded thereon computer-executable instructions which, when executed upon the one or more computer processors, perform a method comprising:

storing a replicated data object on a computer storage medium;

building an index of a replicated data object in memory of a first system node;

a data node that has at least one object which is indexed by the first system node detecting that the first system node has failed;

a membership and routing layer detecting a failed node;

receiving notification of a changed configuration;

the membership and routing layer sending notification of the changed configuration to at least one live data node;

detecting a change in an availability of an index node for data objects stored by the live data node;

determining that a time period for propagation delay has expired and, upon determining the time period expired, initiating data repair procedures;

upon determining the time period has expired, determining a new index node for each data object without a live index node;

a data node having at least one object indexed by the first system node determining, by using membership information of operable nodes in the new configuration, a second system node for rebuilding of the index for the replicated data object;

computing a responsible index node for maintaining index information for the replicated data object using the membership information;

sending an indexing request to the second system node for at least one object without a live index node;

rebuilding the index for the replicated data object; and storing the rebuilt index in computer storage media corresponding to memory of a second system node.

12. The system of claim 11 wherein, when executed, the computer-executable instructions further perform sending an indexing request from a system node storing a replicated data object to the first system node, the indexing request including the location of the replicated data object.

13. The system of claim 11 wherein, when executed, the computer-executable instructions further perform receiving notification of a configuration of operable system nodes.

14. The system of claim 11 wherein, when executed, the computer-executable instructions further perform sending an indexing request to the second system node, the indexing request including the location of the replicated data object.

15. The system of claim 11 wherein, when executed, the computer-executable instructions further perform instantiating a state machine for indicating the state of rebuilding the index of the replicated data object, the state machine maintaining information indicating whether a required number of copies of the replicated data object have been indexed.

16. The system of claim 11 wherein, when executed, the computer-executable instructions further perform receiving notification of expiration of a timer indicating that fewer than the desired number of replicas are indexed.

17. The system of claim 11 wherein, when executed, the computer-executable instructions further perform determining the number of replicas needed for the replicated data object.

18. The system of claim 11 wherein, when executed, the computer-executable instructions further perform g determining that all replicas needed for the replicated data object have been created upon receiving a number of notifications greater than or equal to the desired replication degree for the data object.

19. The system of claim 11 wherein, when executed, the computer-executable instructions further perform applying a policy to select the system nodes for storing replicas of the replicated data object.

20. The system of claim 11 wherein, when executed, the computer-executable instructions further perform sending a request to a subset of system nodes having copies of a data object to send replicas of the data object to other selected system nodes.

* * * * *